United States Patent
Willey

(10) Patent No.: US 9,531,730 B2
(45) Date of Patent: *Dec. 27, 2016

(54) APPARATUS, AND ASSOCIATED METHOD, FOR ALERTING USER OF COMMUNICATION DEVICE OF ENTRIES ON A MAIL MESSAGE DISTRIBUTION LIST

(75) Inventor: William Daniel Willey, Gilroy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 1021 days.

This patent is subject to a terminal disclaimer.

(21) Appl. No.: 12/957,634

(22) Filed: Dec. 1, 2010

(65) Prior Publication Data

US 2011/0078266 A1    Mar. 31, 2011

Related U.S. Application Data

(63) Continuation of application No. 11/424,895, filed on Jun. 19, 2006, now Pat. No. 7,865,555.

(51) Int. Cl.
*H04L 29/06* (2006.01)
*G06Q 10/10* (2012.01)
*H04L 12/58* (2006.01)

(52) U.S. Cl.
CPC ........... *H04L 63/105* (2013.01); *G06Q 10/107* (2013.01); *H04L 12/587* (2013.01); *H04L 51/24* (2013.01)

(58) Field of Classification Search
None
See application file for complete search history.

(56) References Cited

U.S. PATENT DOCUMENTS

| 5,675,733 | A | 10/1997 | Williams |
| 5,694,616 | A | 12/1997 | Johnson et al. |
| 5,765,170 | A | 6/1998 | Morikawa |
| 5,765,178 | A | 6/1998 | Tanaka |
| 5,802,455 | A | 9/1998 | Nishiyama |
| 6,052,709 | A | 4/2000 | Paul |

(Continued)

FOREIGN PATENT DOCUMENTS

| CA | 2592197 | 12/2007 |
| CN | 1431615 | 7/2003 |

(Continued)

OTHER PUBLICATIONS

Canadian Intellectual Property Office, Office Action issued in Canadian Patent Application No. 2,592,197, dated May 14, 2010, 2 pages.

(Continued)

*Primary Examiner* — Peling Shaw
(74) *Attorney, Agent, or Firm* — Fish & Richardson P.C.

(57) ABSTRACT

Apparatus, and an associated method, for alerting a respondent that generates a reply to a received mail message of addressing of the reply message to a non-secure address. A detector detects reception of a received mail message, and a correlator determines whether any of the entries on a distribution list associated with the received mail message is of selected characteristics, i.e., non-secure. If determined to be non-secure, an annunciator generates an annunciation requiring the respondent to elect whether to include the identified address as a recipient of the reply message.

13 Claims, 4 Drawing Sheets

(56) References Cited

U.S. PATENT DOCUMENTS

| | | | |
|---|---|---|---|
| 6,161,130 | A | 12/2000 | Horvitz et al. |
| 6,321,267 | B1 | 11/2001 | Donaldson |
| 6,519,630 | B1 | 2/2003 | Hanawa |
| 6,651,217 | B1 | 11/2003 | Kennedy et al. |
| 6,665,842 | B2 | 12/2003 | Nielsen |
| 6,700,591 | B1 | 3/2004 | Sharpe |
| 7,072,688 | B2 | 7/2006 | Bodnar et al. |
| 7,096,036 | B2 | 8/2006 | Griffin et al. |
| 7,389,322 | B1* | 6/2008 | Miyazawa .................... 709/206 |
| 7,499,976 | B2 | 3/2009 | Cato |
| 7,499,986 | B2 | 3/2009 | Axberg et al. |
| 7,565,404 | B2 | 7/2009 | Gwozdz |
| 7,801,960 | B2 | 9/2010 | Hockey |
| 7,865,555 | B2 | 1/2011 | Willey |
| 7,873,725 | B2 | 1/2011 | Westphal |
| 8,265,665 | B2 | 9/2012 | Lazaridis |
| 2001/0026609 | A1 | 10/2001 | Weinstein et al. |
| 2002/0111887 | A1* | 8/2002 | McFarlane et al. ............ 705/30 |
| 2002/0194002 | A1 | 12/2002 | Petrushin |
| 2003/0084109 | A1 | 5/2003 | Balluff |
| 2003/0135572 | A1 | 7/2003 | Katada |
| 2003/0236847 | A1 | 12/2003 | Benowitz et al. |
| 2004/0018858 | A1 | 1/2004 | Nelson |
| 2004/0030887 | A1 | 2/2004 | Harrisville-Wolff et al. |
| 2004/0068543 | A1* | 4/2004 | Seifert .......................... 709/206 |
| 2004/0103162 | A1* | 5/2004 | Meister et al. ............... 709/206 |
| 2005/0101296 | A1 | 5/2005 | Ito et al. |
| 2005/0165895 | A1 | 7/2005 | Rajan et al. |
| 2006/0004843 | A1 | 1/2006 | Tafoya et al. |
| 2006/0020672 | A1 | 1/2006 | Shannon et al. |
| 2006/0098650 | A1* | 5/2006 | Beninato et al. ............. 370/389 |
| 2007/0204063 | A1 | 8/2007 | Banister et al. |
| 2007/0288575 | A1 | 12/2007 | Gillum et al. |
| 2007/0294390 | A1 | 12/2007 | Willey |
| 2008/0168347 | A1 | 7/2008 | Hallyn |
| 2009/0082043 | A1 | 3/2009 | Lazaridis |
| 2009/0106266 | A1 | 4/2009 | Donatelli et al. |
| 2009/0291665 | A1 | 11/2009 | Gaskarth et al. |
| 2010/0100448 | A1 | 4/2010 | Heigold et al. |
| 2010/0138754 | A1 | 6/2010 | Wilson et al. |
| 2011/0045854 | A1 | 2/2011 | Lazaridis |
| 2011/0078266 | A1 | 3/2011 | Willey |
| 2011/0202824 | A1 | 8/2011 | Raje |
| 2013/0205409 | A1 | 8/2013 | Willey |

FOREIGN PATENT DOCUMENTS

| | | |
|---|---|---|
| EP | 413537 | 2/1991 |
| EP | 420779 | 4/1991 |
| EP | 1096744 A2 | 5/2001 |
| EP | 1871059 A1 | 12/2007 |
| GB | 2353679 | 2/2001 |
| WO | 99/04353 | 1/1999 |

OTHER PUBLICATIONS

Canadian Intellectual Property Office, Notice of Allowance issued in Canadian Patent Application No. 2,592,197, dated Sep. 7, 2011, 1 page.

European Patent Office, Extended Search Report issued in European Patent Application No. 06253152.0, dated Aug. 31, 2006, 3 pages.

United States Patent and Trademark Office, Office Action issued in U.S. Appl. No. 12/621,166, issued Oct. 7, 2011, 10 pages.

United States Patent and Trademark Office, Office Action issued in U.S. Appl. No. 12/621,166, issued Mar. 14, 2012, 10 pages.

United States Patent and Trademark Office, Office Action issued in U.S. Appl. No. 12/917,123, issued Jan. 30, 2012, 13 pages.

United States Patent and Trademark Office, Office Action issued in U.S. Appl. No. 11/424,895, issued Dec. 11, 2008, 9 pages.

United States Patent and Trademark Office, Office Action issued in U.S. Appl. No. 11/424,895, issued Nov. 25, 2009, 14 pages.

United States Patent and Trademark Office, Office Action issued in U.S. Appl. No. 11/424,895, issued Apr. 26, 2010, 12 pages.

United States Patent and Trademark Office, Office Action issued in U.S. Appl. No. 11/859,614, issued May 13, 2011, 11 pages.

United States Patent and Trademark Office, Office Action issued in U.S. Appl. No. 11/859,614, issued Dec. 10, 2010, 11 pages.

United States Patent and Trademark Office, Office Action issued in U.S. Appl. No. 11/859,614, issued Jun. 10, 2010, 11 pages.

* cited by examiner

APPARATUS, AND ASSOCIATED METHOD, FOR ALERTING USER OF COMMUNICATION DEVICE OF ENTRIES ON A MAIL MESSAGE DISTRIBUTION LIST

CROSS-REFERENCE TO RELATED APPLICATION

This application is a continuation of, claims benefit of, and incorporates by reference U.S. patent application Ser. No. 11/424,895 titled "Apparatus, And Associated Method, For Alerting User Of Communication Device Of Entries On A Mail Message Distribution List," filed on Jun. 19, 2006, now U.S. Pat. No. 7,865,555.

The present invention relates generally to communication devices that are capable of communicating mail messages, i.e., text messages addressed to one or more recipients included on a distribution list. More particularly, the present invention relates to apparatus, and an associated method, for warning a user of a communication device that a distribution list to which a mail message is addressed is non-secure, such as an address external to a business, or other, organization.

By warning the user, sending of a reply mail message inadvertently to a non-secure address is less likely to occur. When, e.g., a recipient of a mail message replies "to all" of the entries on the received-message distribution list, an overlooked address on the list, associated with a non-secure destination is highlighted, or otherwise alerted to the user. The user is able then to remove the address from the distribution list of the reply message.

BACKGROUND OF THE INVENTION

Many varied types of communication systems provide for the communication of textual data. Mail messaging, for instance, provides for the communication of textual data to one or more recipients. Many computer, and other digital-based, communication networks sometimes provide for mail messaging. Many communication sessions involve, or consist of, exchange of mail messages between communication devices that are connected to a communication network. The parties to a mail messaging communication session need not concurrently communicate. Rather, by way of, e.g., a store-and-forward scheme, the sending party sends a mail message to a recipient, and the recipient party retrieves the communicated message when convenient. And, the recipient of the communicated message replies to the sent message, for subsequent retrieval by the recipient of the responsive message.

While mail messaging was first carried out between computer stations fixedly connected to wired, local area networks, mail messaging was soon permitted between devices connected to the Internet, or other wide area network. And, more recently, mobile communication devices, such as mobile stations operable in cellular radio communication systems, have been developed that are also capable of sending and receiving mail messages, together with attachments. Communication of textual data with, and between, mobile stations is advantageous for the same reasons for which mail messaging is popularly utilized using computer stations, and the like, that are fixedly connected to a communication network. The user of a mobile communication device retrieves a transmitted message at convenience, and responds thereto, also at convenience.

A conventional mail message is typically formatted to identify to whom to send the message and also a message body. Addressing information is sometimes formed of one or more distribution lists, e.g., a "to:" and a "cc:" list. Each list sometimes includes a significant number of entries. A single message is, as a result, communicated by a single sending station to a plurality of recipient stations. And, a recipient of the message is typically capable of correspondingly communicating a reply to a plurality of communication devices.

While the parties to whom a reply message is sent is generally selectable by the respondent to a received message, the respondent sometimes elects merely to reply to all of the parties to whom the received message was sent. Some mail messaging schemes provide for a "reply to all" configuration in which, as a default, a reply message generated by a recipient is sent to all addresses to which the received message had been sent. That is to say, if the received message includes a "to:" distribution list, the reply message is sent, by default, to all addresses contained in the "to:" distribution list. And, if the received message includes a "cc:" distribution list, the reply message generated by the respondent is sent to all of the entries on the "cc:" distribution list.

A user generating the reply, the respondent, might sometimes not carefully review the entries on the distribution lists to which the reply message is to be sent. And, the respondent might inadvertently send a reply message to a party to whom the respondent might not want the reply message to be sent. For instance, if a mail message is delivered to a party within a business, or other, organization, and the distribution list includes entries that are external to the organization, a reply message generated by the recipient, if sent to all of the parties on the distribution list, is sent to addresses that are external to the organization. If the respondent party fails to notice that a distribution entry is associated with an external address, the respondent might inadvertently send a message, such as a message containing proprietary information, to the external party, inadvertently thereby providing the external party with proprietary information.

As, increasingly, the communication devices between which mail messages are communicated comprise mobile devices, having small user display screens, distribution list entries are more likely not to be noticed. And, in some communication devices, the entries on the distribution lists are not automatically displayed for perusal by a user.

An improved manner by which to alert a user of a communication device, such as a mobile station, that is used pursuant to mail messaging of the distribution list entries, would therefore be advantageous.

It is in light of this background information relating to mail messaging systems that the significant improvements of the present invention have evolved.

DETAILED DESCRIPTION

Figure 1:
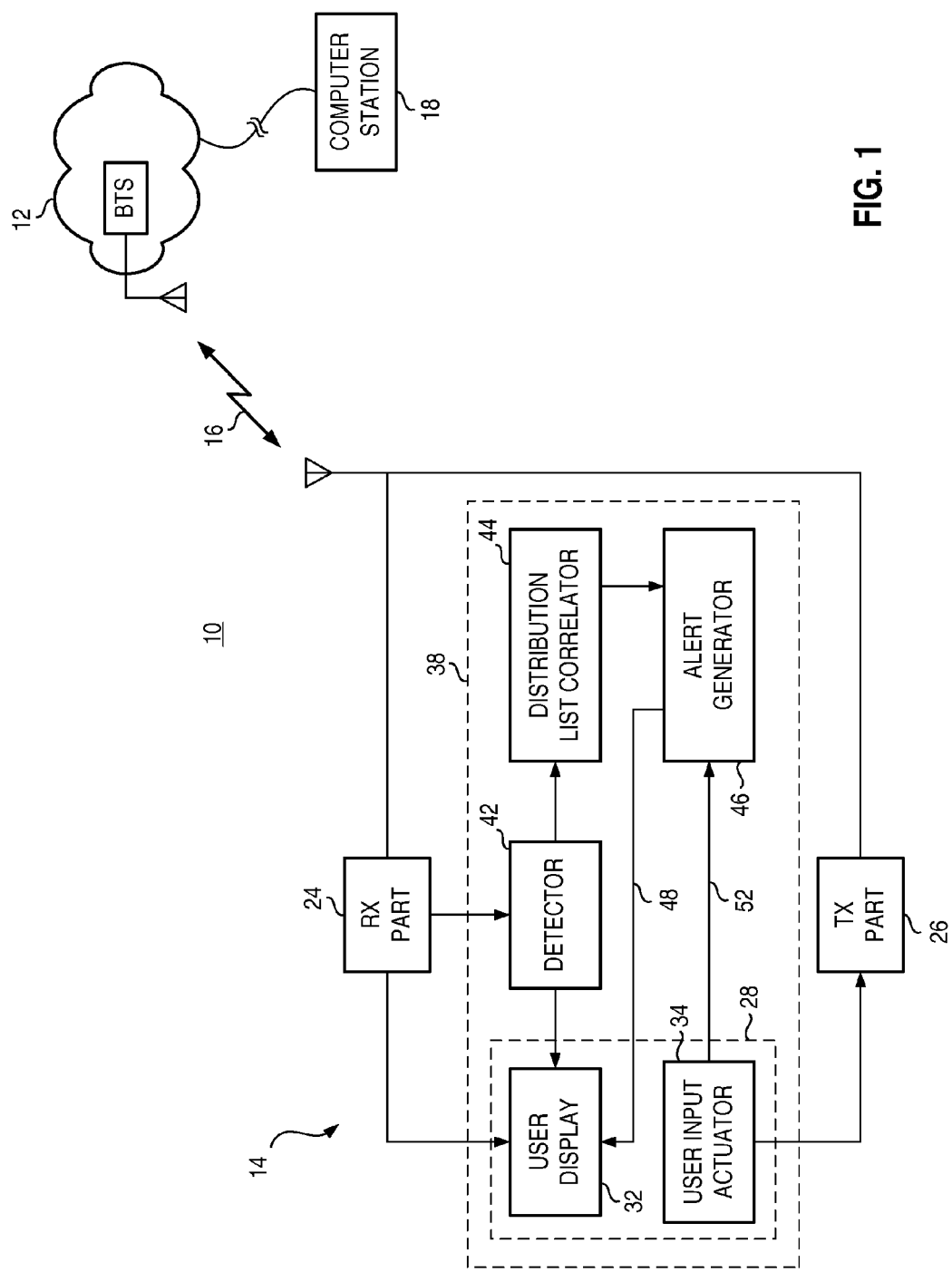
FIG. 1 illustrates a functional block diagram of an exemplary communication system in which an embodiment of the present invention is operable.

The present invention, accordingly, advantageously provides apparatus, and an associated methodology, for a communication device that is capable of communicating mail messages, i.e., text messages addressed to one or more recipients included on a distribution list.

Through operation of an embodiment of the present invention, a manner is provided for warning a user of a communication device that a distribution list entry to which a mail message is addressed is non-secure, such as an address external to a business, or other, organization.

In one aspect of the present invention, the user is warned of a non-secure address in the reply-message distribution list, thereby to lessen the likelihood of inadvertent transmission of the message to the non-secure address. For example, when a recipient of a mail message replies to all of the entries, i.e., a "reply to all", when responding to a received mail message, a determination is made as to whether any of the entries on the "to all" distribution list is a non-secure address. If so-determined, an alert is generated to alert the respondent of the non-secure address. The respondent selects whether to remove the non-secure address from the reply-message distribution list or to affirm that the message is to be sent to the non-secure address. Inadvertent sending of a message to a non-secure address is less likely to occur as the respondent is made aware of the inclusion of the non-secure address on the distribution list.

In another aspect of the present invention, a received-message detector detects delivery at a communication device of a mail message. The mail message includes an addressing part, that is, a list, forming a distribution list, that identifies the addresses to which the received message has been sent. The addresses form entries on distribution lists, such as the to: and the cc: lists that form parts of the received mail message. Such detection identifies each of the addresses to which the received mail message has been sent. When a reply message is addressed to a "reply to all" group of addresses, the distribution list of the resultant reply message is correspondent to, that is, the same as, the received-message distribution list.

In another aspect of the present invention, a distribution list correlator is provided with indications of the entries on the distribution lists associated with the received message to which a reply message is to be responsive. The correlator analyzes the entries formed of the addresses contained on the lists. And, the correlator determines whether any of the addresses form non-secure addresses. The addresses are considered to be non-secure based upon any of various criteria, e.g., the domain of the address. If, for example, the domain of the address indicates the address to be external to the organization of which the recipient forms a portion, the external address is considered to be a non-secure address. In one implementation, multiple security levels are defined; the security levels could be defined in a database in the device, for example.

In another implementation, messages communicated with selected addresses are encrypted. When an entry on a distribution list is associated with an external address with which messages are encrypted, the address can be configured such that it is considered to be secure even though it is an external address.

In order to determine the security level of a message, in one implementation the correlator could use a security level database and a list of address entries programmed in the device. The content of the security level database could be used to aid the correlator in telling the alert generator 46 when and how to alert the user of an external address. Possible settings could include the following: "no alert", "alert user", "force user acknowledgement", "force user acknowledgement only on mixed internal/external". Upon examining a message, if the database were set to "no alert" the correlator would instruct the alert generator not to warn the user about external addresses. Upon examining a message, if the database were set to "alert user", the correlator would instruct the alert generator to highlight on the user display 32 any external addresses in the reply message. Upon examining a message, if the database were set to "force user acknowledgement", the correlator would instruct the alert generator to highlight on the user display 32 any external address in the reply message and, in addition, force a user acknowledgement by means of a popup dialog box to the user, for example, where the dialog box would warn the user of the external addresses and require further input on the user input actuator before the message would be allowed to be sent. Upon examining a message, if the database were set to "force user acknowledgement only on mixed internal/external", the correlator would determine if the addresses on the to: list and cc: list are all external addresses and instruct the alert generator as it would for "alert user" if there were only external addresses and instruct the alert generator as it would for "force user acknowledgement" if there were both internal and external addresses included. Each entry in the address list would consist of a domain or address and associated security parameters. Entries in the address list would correspond to an exception to the behavior specified by the security level database. Possible associated security parameters include "no alert", "alert", "force user acknowledgement", "alert: external but encrypted", "force user acknowledgement: external but encrypted". If the correlator finds an address in the to: list or cc: list whose address list security parameter is set to "no alert", it would treat that address as if it were not an external address and would not trigger an alert upon finding that address; this would be useful for example in the case where a first company whose email addresses used a domain such as company1.com acquired a second company whose email addresses used a second domain such as company2.com and the first company did not want to cause warnings for replies to emails to users of the newly acquired second company. If the correlator finds an address in the to: list or cc: list whose address list security parameter is set to "alert", it would cause the alert generator to generate an alert even if the database were set to "no alert". Likewise, if the correlator finds an address in the to: list or cc: list whose address list security parameter is set to "force user acknowledgement", it would cause the alert generator to generate an alert and to force a user acknowledgement even if the database were set to "no alert". If the correlator finds an address in the to: list or cc: list whose address list security parameter is set to "alert: external but encrypted", it would cause the alert generator to generate a special alert for this address to indicate that it is an external address, but that the email to this address is encrypted such that it would not be readable to someone who intercepted it on the internet; for example, if the alert generator caused addresses that are merely external to be highlighted in red, the alert generator could cause addresses that are external but encrypted to be highlighted in a different color such as yellow. If the correlator finds an address in the to: list or cc: list whose address list security parameter is set to "force user acknowledgement: external but encrypted", it would cause the alert generator to generate a special alert for this address and in addition cause the alert generator to force an acknowledgement from the user and in the acknowledgement indicate to the user that there is an external address to which the message will be encrypted in the to: or cc: list; in the case of all of the external addresses in the message being encrypted, the alert could merely warn the user that there are external addresses to which the message will be encrypted, but in the case of both external addresses in the message with some encrypted and some not, the user would be warned of both in the warning.

In another aspect of the present invention, an annunciator is provided with indications of determinations made by the distribution list correlator and of generation of a reply message responsive to a received mail message. The annunciator generates an alert to alert the respondent of the inclusion of the distribution list of a non-secure address. Responsive to the alert to the respondent, selection is made to remove the non-secure address from the distribution list or to permit the mailing of the reply message to the address that is annunciated.

In another aspect of the present invention, the annunciation made by the annunciator forms a visual display displayed upon the display element of a user interface. Any of various displays are caused to be displayed to alert the respondent to the non-secure address. Highlighting of an address in a display of the distribution list, e.g., alerts the user to the non-secure address. Or, a reordering of the distribution list is carried out to sequence the addresses in the list to identify, e.g., the non-secure address at a top part of the listing. Or, the user display displays a pop-up dialog box that identifies the non-secure address to provide the respondent with the opportunity to remove the address from the distribution list before sending the message.

Thereby, the user is alerted to the presence of a non-secure address in the distribution list associated with the reply message that is generated to reply to a received message. Inadvertent mailing of a message to a non-secure address is less likely to occur.

In these and other aspects, apparatus, and an associated method, is provided for generating an alert for a user of a communication device that communicates mail messages. An outgoing message detector is configured to detect generation, at the communication device, of an outgoing mail message addressed to an outgoing distribution list and to detect each entry of the outgoing distribution list. An annunciator is adapted to receive indications of the outgoing distribution list detected by the outgoing message detector. The annunciator is configured to annunciate an entry on the outgoing distribution list to which the outgoing mail message is addressed if indicative of an address of first selected parameters.

Referring, therefore, first to FIG. 1, a communication system, shown generally at 10, provides for communication of textual data, herein referred to as messages, between communication stations. In the exemplary implementation, the communication system 10 forms a radio communication system having a network part 12 that communicates with communication devices, of which the mobile station 14 is exemplary. The messages are communicated between the network part and the mobile station by way of a radio air interface, here represented by the arrow 16.

A mail message originated at a communication endpoint, here represented by a computer station 18, is routed, by way of the network part and the radio air interface for delivery to the mobile station 14. And, a message originated at the mobile station for delivery to the computer station 18 is sent by way of the radio air interface and the network part 12. And, a reply message, generated at the mobile station in response to a message received from the computer station 18 is similarly sent by way of the radio air interface and the network part for delivery to its destination. A mail message includes a header, or addressing, part to which a message body is concatenated. The addressing or header part contains the address, of an RFC 822 address of the person to whom the message is to be sent. When the message is to be sent to multiple destinations, the addressing or header part of the message identifies the addresses of the multiple destinations.

Conventional mail messaging applications are available, and regularly utilized by users of computer stations and other communication devices by which to communicate mail messages. The mail message applications typically permit a user to enter textual data by way of a keyboard, or other input actuator, and to address the mail message with the address or addresses to which the mail message is to be sent. The addresses are sometimes mnemonics that are converted by a communication system pursuant to routing of the message, when sent.

The mobile station 14 includes radio transceiver circuitry, here represented by a receive part 24 and a transmit part 26, that transceiver signals with the network part 12, including signals representative of mail messages that are communicated pursuant to a mail messaging communication scheme. When a mail message is sent to the mobile station, the receive part 24 detects its delivery at the mobile station. And, the transmit part operates to send a message formed at the mobile station upon the radio air interface 16. Analogous structure permits messages to be generated and received at other communication devices, of which the computer station 18 is representative.

The mobile station also includes a user interface 28 including a user display 32 and a user input actuator 34. The user display is conventionally formed of a liquid crystal display, or the like, of dimensions permitting its positioning at a face of the housing that supports the mobile station. And, the user input actuator conventionally forms a keypad actuator, sometimes including a qwerty keyboard. Due to the need to package the mobile station in a housing of small configuration, the user display typically is of height-wise and width-wise dimensions of only several centimeters. The amount of information displayable, at any time, upon the display is thereby limited. For instance, when the display displays a received mail message, if the message is lengthy, only a portion of the message is displayable at any time. A scrolling feature is sometimes provided to permit manual, or automatic, scrolling through the entire text of the message. And, if displayed, the distribution list, or the addresses to which the received message has been sent, is displayed on the display element. But, the entries on the distribution list are typically not prominently indicated. The entries, in some applications, e.g., are listed in a horizontal series, one following another, segregated only by, e.g., their entry on a to: or cc: list. A viewer of the display, i.e., the user of the mobile station, might easily not notice every one of the entries identified on the distribution list. If, in response to a received message, the user of the mobile station elects to reply with a reply message, the user might elect also to reply to all of the entries on the distribution list associated with the received message. However, the respondent, i.e., the user, might not notice, or be cognizant of, each of the addresses to which the reply message is to be sent. And, a reply message might include information that would be inappropriate for delivery to one or more of the addresses on the distribution list. The respondent in such a scenario would inadvertently send a reply message to an inappropriate party.

To reduce the likelihood of such an occurrence, the mobile station 14 includes apparatus 38 of an embodiment of the present invention. The apparatus operates to facilitate alert to a user of a distribution list entry that is determined to be an address associated with a non-secure location, thereby to alert the user of the mobile station of its inclusion on the reply-message distribution list. By alerting the respondent of the inclusion of the non-secure address on the distribution list, the respondent is provided additional opportunity to remove the entry from the distribution list. The apparatus is functionally represented, implementable in any desired manner, including by algorithms executable by processing circuitry. Non-secure is definable in any desired manner, defined, e.g., by the domain of the address being different that the user's, the address not contained on a "friends" list, etc.

The apparatus includes a detector 42 that is connected to the receive part to receive indications of reception at the mobile station of a received message together with its distribution list or lists. Detections made by the detector are provided to a distribution list correlator 44. The correlator 44 analyzes the detected distribution list entries of the received message and determines whether the entries are of selected characteristics, such as, e.g., associated with domains other than the domain of which the mobile station is associated. The selected characteristics also include, in one implementation, indications of whether the address of the entry is an address with which messages are communicated in encrypted form. The correlator, in a further implementation, provides multiple determinations, permitting corresponding multiple security levels or warning levels to be associated with the addresses forming the entries on the distribution list or lists. The characteristics used by the determiner and compared with the entries of the distribution lists are, in one implementation, user selectable. In another implementation, the characteristics are selected elsewhere, such as by a business organization security department. For instance, a policy is selected, or otherwise mandated, by appropriate department personnel, provided to a communication server, such as a BlackBerry® Enterprise Server (BES) that operates thereafter in conformity with the policy. Friend lists, e.g., are also selectable by a user. Other-company lists (i.e., external company lists) are analogously selectable.

For the case of policy selected by appropriate department personnel and provided to a communication server such as a BES, the policy would be programmed for a particular user in the communication server and then sent (i.e. pushed) to the user's device 14 and then stored in the memory of the device 14. As described above, a device could include a security level database and also an address list whose members have associate security parameters. For devices newly activated, the policy could specify a default security level database and also a default address list. The policy could also specify whether the user is allowed to change the security level database and or address list. If the department personal determined a need to change the policy, they would update the policy (including security level database and address list) in the communication server and then the new policy would be pushed to the device and programmed into the device. The policy could also allow the user to program in his device include additional members in the address list in addition to the ones provided in the policy pushed to the device; the policy could also disallow the user from doing this.

The apparatus further includes an alert generator 46 that is coupled to receive indications of determinations made by the correlator, at least of the entries that are of selected parameters that are indicative of an entry that is non-secure. When the user of the mobile station elects to reply to a received message using a distribution list of the received message, the alert generator causes generation of an alert, here a visual alert, to alert the user of the mobile station of the inclusion of the non-secure address on the responsive message distribution list. The line 48 extending between the alert generator and the display is representative of the provision of the alert to the display element. And, the line 52 is representative of an indication provided to the alert generator of a reply message generated by the user in reply to a received message and, specifically, a reply message that utilizes part, or all, of a distribution list of the received message.

In one implementation, the alert generated by the alert generator requires additional input by the user of the mobile station to permit subsequent reply-message transmission. Thereby, the user is compelled to affirm that the sending of the message to the alerted address is appropriate or elect to remove the address from the distribution list of the reply message.

Thereby, a user is less likely to inadvertently to send a reply message to a party to whom the sending of the message would be inappropriate.

Figure 2:
FIG. 2 illustrates an exemplary set of mail messages, a received mail message, and a reply message generated during operation of a communication device of the communication system shown in FIG. 1.

FIG. 2 illustrates an exemplary set 54 of mail messages communicated during operation of the communication system 10 shown in FIG. 1. The set of mail messages includes a first mail message 56 and a second message 58. The first message 56 is representative of a mail message received at the mobile station 14, originated at the computer station 18. And, the second message 58 is representative of a reply message, generated at the mobile station in reply to the received message, received at the mobile station.

In conventional manner, the mail message includes an addressing part including a from: 62 line, a to: 64 line, a cc: line 66, and a subject: line 68. The addresses identified on the lines 62, 64, and 66, or their RFC 822 equivalents, are sometimes referred to as being part of the message header part of the mail message. The mail message also includes a body 72 that forms the message readable by the recipient of the message.

If the received mail message 56 chooses to reply, the recipient generates a reply message body 74. Sometimes, when the recipient chooses to reply to the received message, the recipient, now referred to as a respondent, elects to send the reply message to each of the addresses to which the received message had been sent. That is to say, the same addresses, with appropriate change in message direction, that are listed on the lines 62, 64, and 66 in the first message 56, are used to address the reply message that is formed at the mobile station for return to the originating location, thereby to inform all of the parties that were addressed in the first message of the reply made by the respondent.

As noted above, the respondent may inadvertently include addresses of parties that should not receive the reply message for any of various reasons. For instance, the reply message might contain proprietary information or other information not appropriate for reading by certain parties. Through operation of the apparatus 38 shown in FIG. 1, the inadvertent sending of a message to an address identified to be non-secure, i.e., exhibit characteristics, such as a foreign domain name, is less likely to occur. The respondent is alerted to the address, and the respondent elects whether to include the address in the list of addresses to which the reply message is sent.

Alert of the addresses made to the respondent in any of various manners using displays caused to be displayed upon the user display 32 shown in FIG. 1. The user display is caused, for instance, to modify the text of the identified address by changing its color of display, by highlighting the address, by bolding the address, by changing the font of the address, or any other manner by which to make the identified address or addresses different than others of the addresses.

Or, for instance, the company name or domain name of the identified address is displayed in parentheses next to the name identified by the address. When the distribution list, i.e., the to: and cc: lists, are so lengthy as not to fit on the user display, the addresses are sortable such that the identified addresses are prioritized to ensure better viewing on the user display. The user display, in one implementation, presents a pop-up dialog box to alert the respondent of the identified address. For instance, upon completing the reply message and initiating its sending by means of the input actuator on the user input actuator, the pop-up dialog box is caused to be displayed together with a message such as, "This message is addressed to external email addresses. Are you sure you want to send it?" And, appropriate response selections, such as, "send", "view external addresses", and "cancel", are available for user selection, also by way of actuation of the user input actuator.

Thereby, the user is provided with an option to send or to cancel sending of the message to the identified address or addresses. If the list is of a relatively short length, that is, short enough to be displayed, the "view external addresses" selection is, if desired, omitted from the initial dialog box and the addresses are simply displayed. And, in another implementation, the user is forced to view each identified address, e.g., each external or foreign address, prior to permitting the sending of the message.

Selection of the criteria used by which to identify the addresses that are non-secure is, in one implementation, user selectable, such as by way of user actuation of actuation keys of the user input actuator. In another implementation, the criteria is selected by supervisory personnel of a business organization and implemented on the organization's BES or other communication server. Any email with an external email address in the reply-message distribution list is warned. The external email address is determined by the domain name of the email address. In such an implementation, if the domain name of the address is not equal to the domain name of the recipient's address, a warning is generated. Alternately, a warning is generated when the distribution list of the reply message includes both internal and external addresses. And, in another implementation, specific domain names, or individual addresses, are configured that, when identified, do not cause generation of the warning. A flag value, e.g., associated with the address or domain name is detected and its detection causes the warning, that otherwise would be generated, not to be generated.

Additionally, in one implementation, several levels of security are defined, and annunciation is made in different manners depending upon which level of security that an address is associated. For instance, with respect to the exemplary distribution lists shown in the messages of FIG. 2, the address associated with harry.johnson@company2.com is alerted in a manner different than the manner by which the address associated with mary.davis@competitor1.com is alerted. In various implementations, combinations of the aforementioned alerting procedures and protocols are utilized. And, in yet further implementations, other manners of alerting, including aural alerting procedures are utilized.

Figure 3:
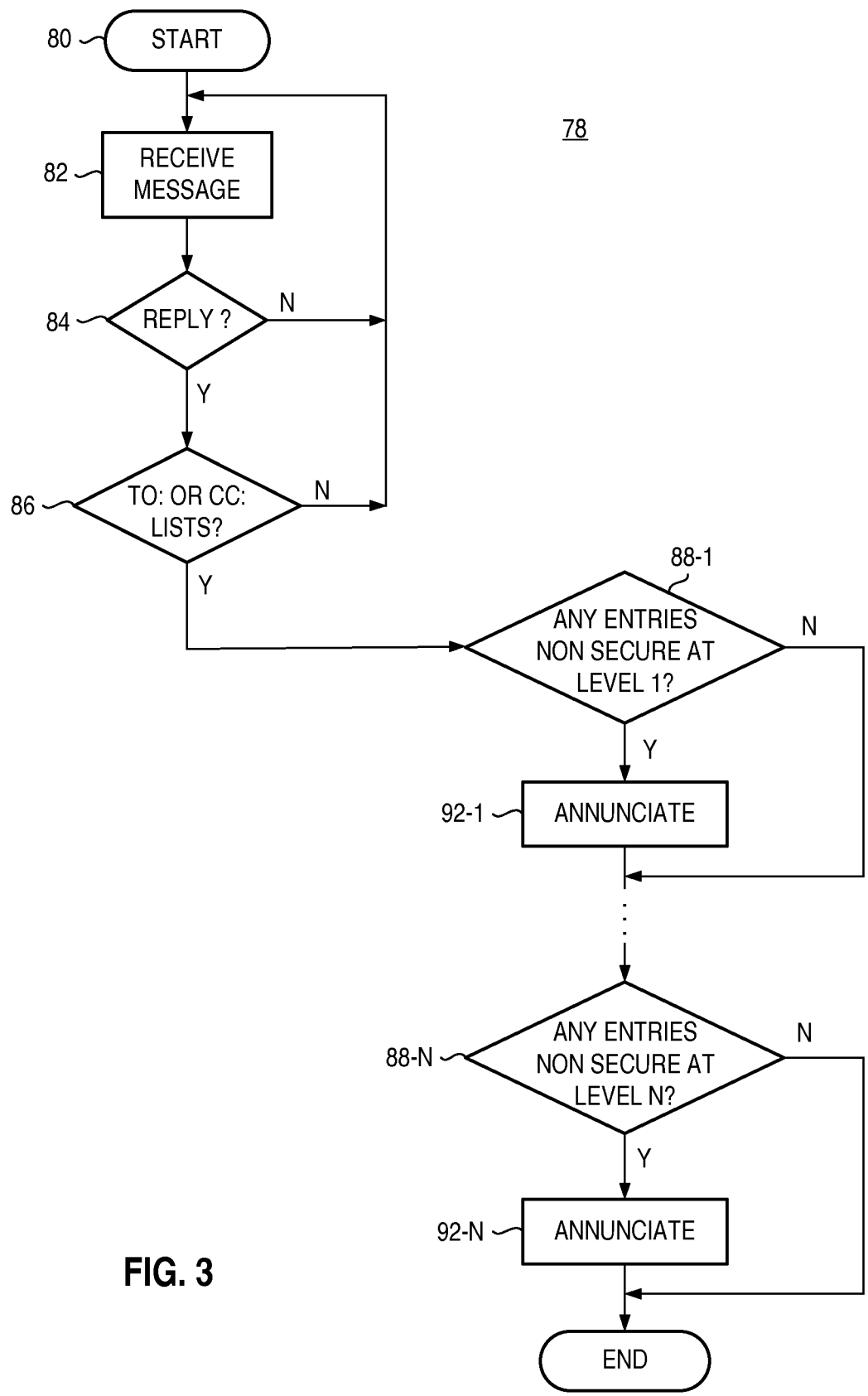
FIG. 3 illustrates a process diagram representative of exemplary operation of an embodiment of the present invention.

FIG. 3 illustrates a process diagram shown generally at 78, representative of exemplary operation of the apparatus 38 embodied at the mobile station 14 of an embodiment of the present invention.

Subsequent to start at the start block 80, and as indicated by the block 82, a message is received at the mobile station. Reception of the message is detected, for instance, by the detector 42. Then, as indicated by the decision block 84, a determination is made as to whether a reply is generated in response to the received message. If not, the no branch is taken back and monitoring is performed to detect reception of a subsequent, received message. If the user elects to respond, the yes branch is taken to the decision block 86. At the decision block 86, a determination is made as to the existence of distribution lists, either to: or cc: lists, in the received message that are elected to be used for the reply message. If not, a no branch is again taken.

If, distribution lists are to be used in the reply message, the yes branch is taken to the decision block 88-1 and a determination is made as to whether any list entries are associated with a certain level of security. If so, the yes branch is taken to the block 92-1, and annunciation is made. If not, the no branch is taken to the decision block 88-N, and a determination is made as to whether any of the entries on the distribution list are associated with an nth level of security. If not, a no branch is taken to an end block. Otherwise, the yes branch is taken to block 92-N, and annunciation is caused to be made.

Figure 4:
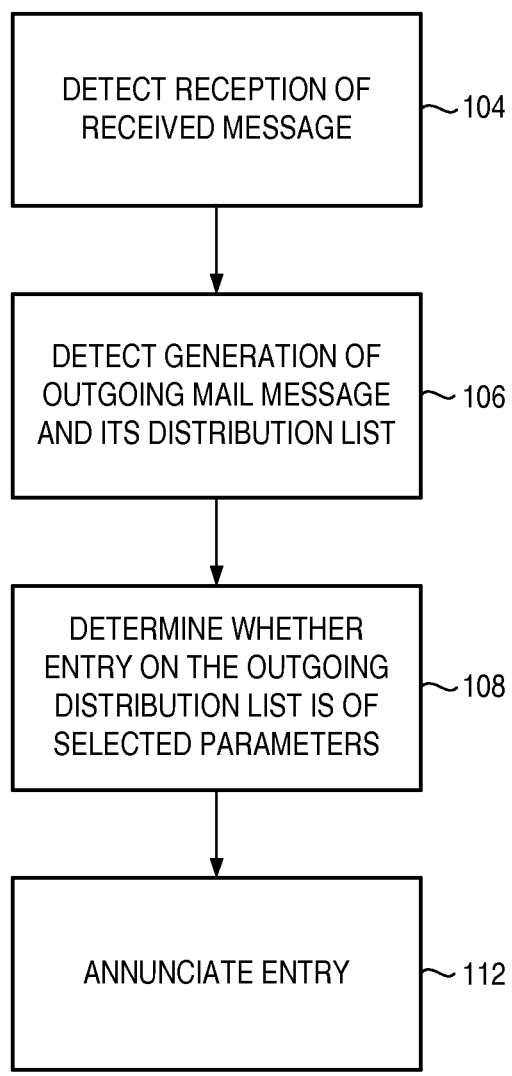
FIG. 4 illustrates a method flow diagram representative of the method of operation of an embodiment of the present invention.

FIG. 4 illustrates a method flow diagram, shown generally at 102, representative of operation of an embodiment of the present invention. The method generates an alert for a user of a communication device that communicates mail messages.

First, and as indicated by the block 104, detection of reception of a received message is made. Then, and as indicated by the block 106, generation, at the communication device, of an outgoing mail message addressed to an outgoing distribution list is detected together with each entry of the outgoing distribution list.

Then, and as indicated by the block 108, a determination is made whether an entry on the outgoing distribution list is indicative of an address of first selected parameters. And, as indicated by the block 112, entry on the outgoing distribution list indicative of an address of the first selected parameters is annunciated.

Thereby, through operation of an embodiment of the present invention, a manner is provided by which inadvertent sending of a reply message to an address that is non-secure, or is otherwise inappropriate, is less likely to occur.

The previous descriptions are of preferred examples for implementing the invention, and the scope of the invention should not necessarily be limited by this description. The scope of the present invention is defined by the following claims.

What is claimed is:

1. A method comprising:
   displaying an unsent outgoing text message including one or more electronic addresses;
   determining whether any of the one or more electronic addresses is a non-secure address;
   providing a warning of any non-secure address.

2. The method of claim 1, wherein the non-secure electronic address comprises a domain name identified as non-secure.

3. The method of claim 1, wherein a non-secure electronic address has a domain name different than a domain name for a sender of the text message.

4. The method of claim 1, wherein a non-secure electronic address has a domain name on a non-secure domain name list.

5. The method of claim 1, wherein the non-secure electronic address comprises an address external to a business or organization of a sender of the text message.

6. The method of claim 1, wherein the warning comprises highlighting non-secure addresses of the one or more electronic addresses.

7. The method of claim 1, wherein the warning comprises coloring the non-secure addresses in a first color.

8. The method of claim 1, further comprising receiving affirmation to send the text message before sending the text message.

9. The method of claim 1, wherein the text message is an email message.

10. The method of claim 1, wherein the warning is provided while the unsent outgoing text message is unsent.

11. The method of claim 1, wherein the domain name follows an @ symbol in the electronic address.

12. A method comprising:
   providing, by a communication device, a warning indicative of a non-secure electronic message address being included within an unsent electronic message.

13. The method of claim 12, wherein the non-secure electronic message address has a domain name different than a domain name of the sender of the unsent electronic message.

\* \* \* \* \*